United States Patent
Khalid et al.

(10) Patent No.: US 10,511,658 B1
(45) Date of Patent: *Dec. 17, 2019

(54) COMPUTING RESOURCE TRANSITION NOTIFICATION AND PENDING STATE

(71) Applicant: Amazon Technologies, Inc., Seattle, WA (US)

(72) Inventors: Ahmed Usman Khalid, Port Coquitlam (CA); Eric Samuel Stone, Seattle, WA (US); Nikita Pinski, Vancouver (CA); Alexander Kulikov, Seattle, WA (US); Derek Solomon Pai, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/497,587

(22) Filed: Apr. 26, 2017

Related U.S. Application Data

(63) Continuation of application No. 14/303,868, filed on Jun. 13, 2014, now Pat. No. 9,674,302.

(51) Int. Cl.
  *G06F 15/173* (2006.01)
  *H04L 29/08* (2006.01)
  *H04L 12/911* (2013.01)
  *H04L 12/58* (2006.01)

(52) U.S. Cl.
  CPC .......... *H04L 67/1002* (2013.01); *H04L 47/70* (2013.01); *H04L 51/24* (2013.01)

(58) Field of Classification Search
  CPC ...... H06L 67/1002; H06L 47/70; H06L 51/24
  USPC ................... 709/223, 225, 226, 229
  See application file for complete search history.

(56) References Cited

U.S. PATENT DOCUMENTS

| | | | | |
|---|---|---|---|---|
| 6,148,322 | A * | 11/2000 | Sand | G06F 9/4837 718/102 |
| 6,353,447 | B1 * | 3/2002 | Truluck | G09B 5/14 434/323 |
| 7,809,606 | B2 * | 10/2010 | MacMillan | G06Q 10/0838 705/14.4 |
| 7,849,498 | B2 * | 12/2010 | Royer | G06F 21/41 709/229 |
| 2007/0000369 | A1 * | 1/2007 | Okuyama | G10G 7/02 84/19 |
| 2009/0183208 | A1 * | 7/2009 | Christensen | H04N 7/17318 725/58 |
| 2011/0040618 | A1 * | 2/2011 | Wagenblatt | G06Q 30/02 705/14.46 |
| 2011/0212711 | A1 * | 9/2011 | Scott | G06Q 10/109 455/414.2 |
| 2012/0155266 | A1 * | 6/2012 | Patel | H04L 47/125 370/235 |
| 2012/0259671 | A1 * | 10/2012 | Oden | G06Q 10/063 705/7.17 |
| 2014/0325524 | A1 * | 10/2014 | Zangaro | G06F 9/5083 718/105 |

(Continued)

*Primary Examiner* — Liang Che A Wang
(74) *Attorney, Agent, or Firm* — BakerHostetler

(57) ABSTRACT

A computing resource associated with a user is scheduled to undergo a transition. Prior to the scheduled transition, the computing resource is placed in a pending state. The user is notified that the computing resource is scheduled to undergo the transition. In response to an input received from the user, the computing resource is allowed to undergo the transition when the input indicates that the transition can proceed.

12 Claims, 7 Drawing Sheets

(56) References Cited

U.S. PATENT DOCUMENTS

2014/0344745 A1* 11/2014 Possing ............... G06Q 10/109
715/772

* cited by examiner

COMPUTING RESOURCE TRANSITION NOTIFICATION AND PENDING STATE

CROSS-REFERENCE TO RELATED APPLICATION

This application is a continuation of U.S. application Ser. No. 14/303,868 filed Jun. 13, 2014, entitled "COMPUTING RESOURCE TRANSITION NOTIFICATION AND PENDING STATE", the entirety of which is incorporated herein by reference.

BACKGROUND

A data center is a facility that houses computer systems and various networking, storage, and other related components. Data centers may, for example, provide computing services to businesses and individuals as a remote computing service or to provide "software as a service" (e.g., cloud computing). To facilitate utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner. Resources, such as virtual machines, may be launched, terminated, or otherwise transitioned in their operational state.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Embodiments of systems and methods are described for providing by a provider network such as a data center, computing resources such as virtual instances, and allowing customers to take custom actions when the computing resources are transitioned (e.g., launching or terminating the computing resources). For example, in one embodiment a computing resource associated with a customer of the provider network may be scheduled to undergo a transition, such as a launch or termination. Prior to the scheduled transition, the computing resource may be placed in a pending or wait state. The pending state or wait state may be any state where the computing resource is available to the customer associated with the computing resource, where the computing resource is not yet in a production or operational mode. The provider network may notify the customer that the customer's resource is scheduled to launch or terminate. The notification may be made using a messaging service. The provider network may keep the resource in the pending or wait state while the customer is provided the opportunity to take actions such as downloading logs or installing software. Once the customer has completed any desired actions, the customer can notify the provider network to proceed with the launch or termination. The transition can include other significant transitions such as placing the resource behind a load balancer. The customer may also provide an update if more time is needed in the pending state.

The customer may be notified in various ways. For example, the customer may be provided with a message notification that a computing resource will be launched, or that a computing resource will be terminated. The customer may take an action in response to the notification. For example, if a current computing resource will be terminated, the customer may take actions to save data for applications running on the computing resource before the resource is no longer available. As another example, workflows running on the computing resource may be redistributed to other computing resources to avoid interruptions to the services provided by the workflows.

Figure 1:
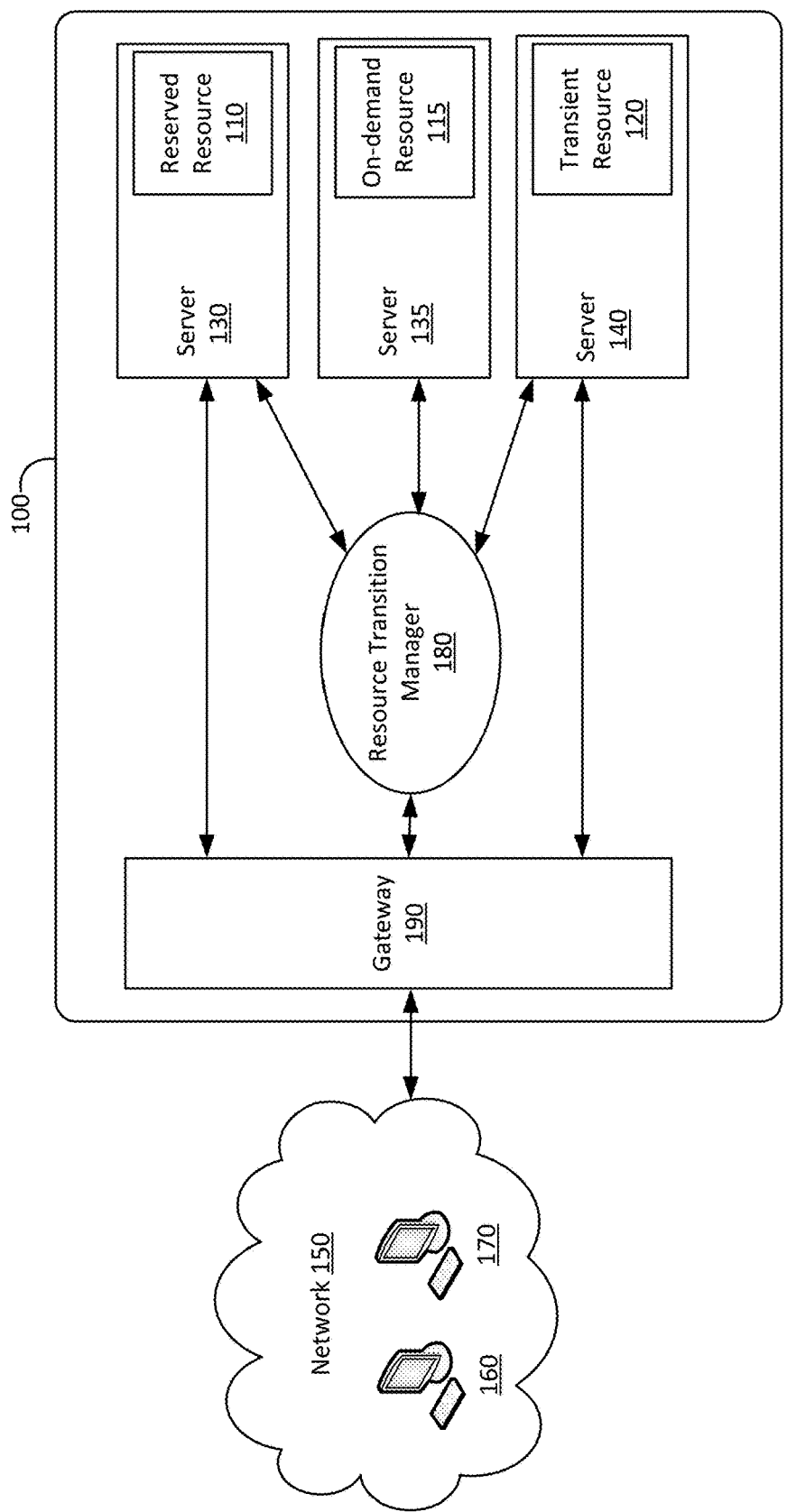
FIG. 1 is a diagram illustrating a mechanism for providing transition notifications in accordance with the present disclosure.

FIG. 1 is a diagram illustrating a system 100 including functionality for allowing user actions during resource transitions in accordance with the present disclosure. In FIG. 1, system 100 may include a reserved resource 110, an on-demand resource 115, and a transient resource 120 that may execute, for example, on one or more server computers 130, 135, and 140, respectively. It will be appreciated that some embodiments may involve additional resources of various types that may be instantiated on additional server computers.

FIG. 1 also illustrates a public network 150 that may include one or more computers, such as computers 160 and 170. According to one embodiment, resources 110, 115 and 120 may be configured to provide computing services to a computer user (not shown) of public network 150 via gateway 190 and computers 160 and 170. For example, reserved resource 110 may provide a set of remote access enterprise applications to a group of users who may, for example, be employees of an enterprise customer.

A user at computer 160 or 170 may send a request to a resource transition manager 180 for managing transitions of computing resources and managing action requests. In some embodiments, a notification of a transition may be sent directly to the user at computer 160 or 170. In response to receipt of a transition notification, a user at computer 160 or 170 may send one or more responses or inputs. The responses or inputs may indicate an approval to proceed with the transition, or a request to delay or modify the transition. The resource transition manager 180 may log the responses or inputs and provide updates as to the status of the transition to other services and systems. The resource transition manager 180 may communicate with other services to facilitate: (1) receiving information pertaining to resource transitions, (2) sending notifications to customers regarding the resource transitions, and (3) fulfillment of action requests from users or rescheduling of resource transitions. The resource transition manager 180 may, for example, provide an interface for reviewing notifications and status of resource transitions. The resource transition manager 180 may further provide an interface for modifying or cancelling a resource transition.

Various aspects of the disclosure are now described with regard to certain examples and embodiments, which are intended to illustrate but not to limit the disclosure. It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Networks established by or on behalf of an entity such as a company or organization to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor or another type of program configured to enable the execution of multiple instances).

A number of different types of computing devices may be used singly or in combination to implement the resources of the provider network in different embodiments including general purpose or special purpose computer servers, storage devices, network devices and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++, and the like, or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 2:
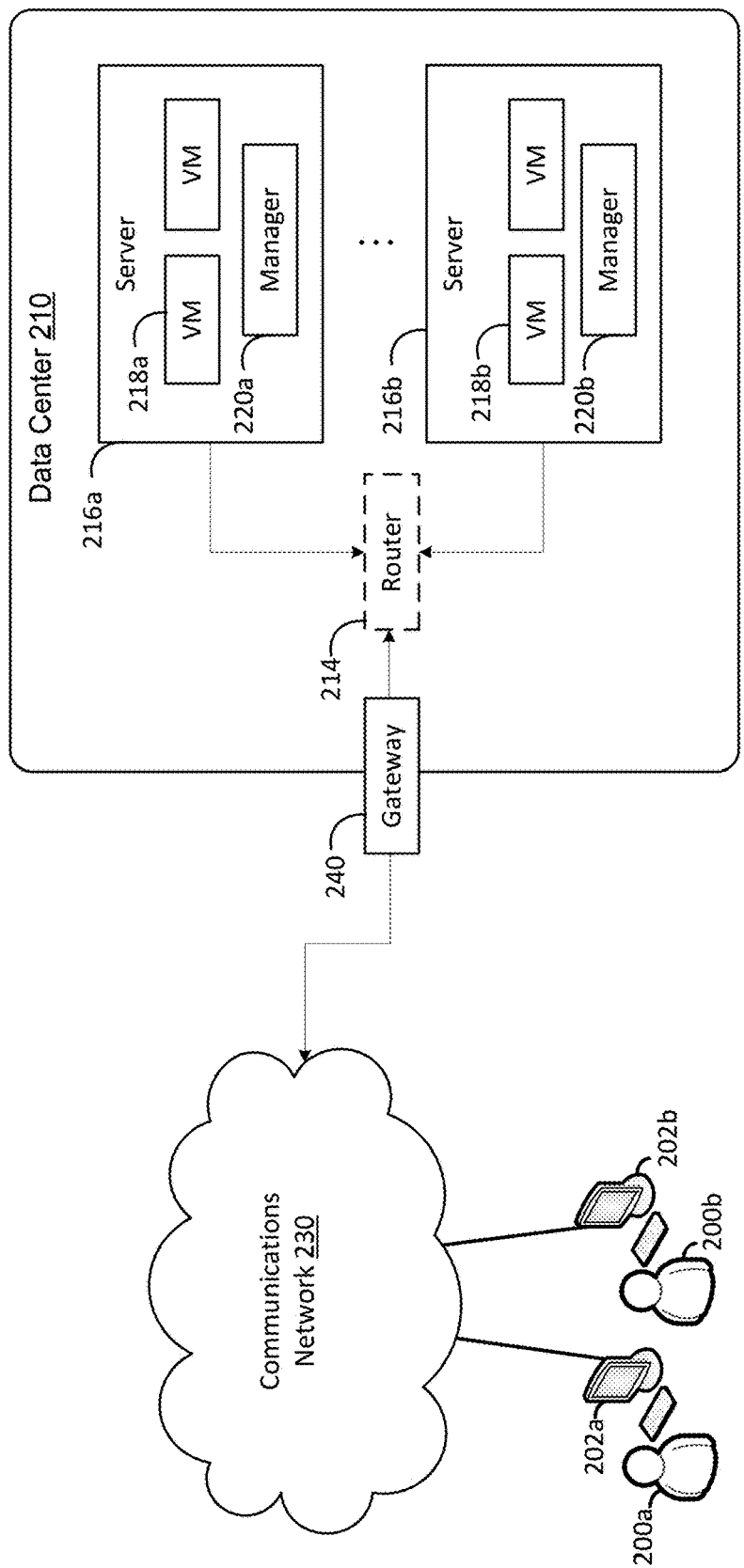
FIG. 2 is a diagram illustrating an example computing system that may be used in some embodiments.

FIG. 2 illustrates an example computing environment in which the embodiments described herein may be implemented. FIG. 2 is a diagram schematically illustrating an example of a data center 210 that can provide computing resources to users 200a and 200b (which may be referred herein singularly as "a user 200" or in the plural as "the users 200") via user computers 202a and 202b (which may be referred herein singularly as "a computer 202" or in the plural as "the computers 202") via a communications network 230. Data center 210 may be configured to provide computing resources for executing applications on a permanent or an as-needed basis. The computing resources provided by data center 210 may include various types of resources, such as data processing resources, data storage resources, data communication resources and the like. Each type of computing resource may be general-purpose or may be available in a number of specific configurations. For example, data processing resources may be available as virtual machine instances. The instances may be configured to execute applications including Web servers, application servers, media servers, database servers and the like. Data storage resources may include file storage devices, block storage devices and the like.

Each type or configuration of computing resource may be available in different sizes, such as large resources, consisting of many processors, large amounts of memory and/or large storage capacity, and small resources consisting of fewer processors, smaller amounts of memory and/or smaller storage capacity. Customers may choose to allocate a number of small processing resources as Web servers and/or one large processing resource as a database server, for example.

Data center 210 may include servers 216 that provide computing resources available as virtual machine instances 218a and 218b (which may be referred herein singularly as "a virtual machine instance 218" or in the plural as "the virtual machine instances 218"). The virtual machine instances 218 may be configured to execute applications, including Web servers, application servers, media servers, database servers and the like. Other resources that may be provided include data storage resources (not shown) and may include file storage devices, block storage devices, and the like.

The availability of virtualization technologies for computing hardware has provided benefits for providing large scale computing resources for customers and allowing computing resources to be efficiently and securely shared between multiple customers. For example, virtualization technologies such as those provided by VMware® or other virtualization systems, may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 2, communications network 230 may, for example, be a publicly accessible network of linked networks and possibly operated by various distinct parties, such as the Internet. In other embodiments, communications network 230 may be a private network, such as, for example, a corporate or university network that is wholly or partially inaccessible to non-privileged users. Still in other embodiments, communications network 230 may include one or more private networks with access to and/or from the Internet.

Communication network 230 may provide access to computers 202. Computers 202 may be computers utilized by customers 200 or other customers of data center 210. For instance, user computer 202a or 202b may be a server, a desktop or laptop personal computer, a tablet computer, a wireless telephone, a personal digital assistant (PDA), an e-book reader, a game console, a set-top box, or any other computing device capable of accessing data center 210. User computer 202a or 202b may connect directly to the Internet (e.g., via a cable modem or a Digital Subscriber Line [DSL]). Although only two user computers 202a and 202b are depicted, it should be appreciated that there may be multiple user computers.

Computers 202 may also be utilized to configure aspects of the computing resources provided by data center 210. In this regard, data center 210 might provide a Web interface through which aspects of its operation may be configured through the use of a Web browser application program executing on user computer 202. Alternatively, a stand-alone application program executing on user computer 202 might access an application programming interface (API) exposed by data center 210 for performing the configuration operations. Other mechanisms for configuring the operation of the data center 210, including deploying updates to an application, might also be utilized.

Servers 216a and 216b (which may be referred herein singularly as "a server 216" or in the plural as "the servers 216") shown in FIG. 2 may be standard servers configured appropriately for providing the computing resources described above and may provide computing resources for executing one or more applications. In one embodiment, the computing resources may be virtual machine instances 218. In the example of virtual machine instances, each of the servers 216 may be configured to execute an instance manager 220a or 220b (which may be referred herein singularly as "an instance manager 220" or in the plural as "the instance managers 220") capable of executing the virtual machine instances. The instance managers 220 may be a virtual machine monitor (VMM) or another type of program configured to enable the execution of virtual machine instances 218 on server 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 2, a router 214 may be utilized to interconnect the servers 216a and 216b. Router 214 may also be connected to gateway 240 which is connected to communications network 230. Router 214 may manage communications within networks in data center 210, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 210 described in FIG. 2 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The capacity of purchased computing resources provided by data center 210 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of data center 210 can be scaled on-demand.

Auto scaling is one mechanism for scaling computing resources in response to increases or lulls in demand for the resources. Auto scaling allows customers of data center 210 to configure data center 210 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 210.

Data center 210 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, and provide cache warming logic specifying how an application cache should be prepared and other types of information. The deployment component utilizes the customer-provided configuration and cache warming logic to launch, configure and prime new instances of computing resources.

Operators of provider networks such as those described above may, in some embodiments, implement a flexible set of resource reservation, control and access interfaces for their clients. For example, a resource manager of the provider network may implement a programmatic resource reservation interface (e.g., via a Web site or a set of Web pages) that allows clients to learn about, select, purchase access to, and/or reserve resource instances. In some of the various embodiments discussed below, where an entity such as a resource manager is described as implementing one or more programmatic interfaces such as a Web page or an application programming interface (API), an interface manager subcomponent of that entity may be responsible for the interface-related functionality. In some embodiments, equivalent interface-related functionality may be implemented by a separate or standalone interface manager, external to the resource manager. Such an interface may include functionality to allow browsing of a resource catalog, provide details, and specifications of the different types or sizes of resources supported, the different reservation types or modes supported, pricing models and so on.

In some embodiments, the provider network may support several different purchasing modes (which may also be referred to herein as reservation modes) such as long-term reservations, on-demand resource allocation, or spot-price-based resource allocation. Using the long-term reservation mode, a client may make, for example, a low, one-time, upfront payment for a resource instance, reserve the resource instance for a specified duration such as a one- or three-year term, and pay a low hourly rate for the instance. In this case, the client may be assured of access to the reserved instance for the full term of the reservation.

Using on-demand mode, a client may pay for capacity by the hour (or some other appropriate time unit), without any long-term commitments or upfront payments. When using an instance obtained in on-demand mode, the client may be allowed to extend the allocation period as needed, and thus maintain client access to the instance until the client voluntarily relinquishes access (e.g., by terminating the instance). Similarly, in the case of a long-term reserved instance, a client may have uninterrupted access to the instance for the term of the reservation, and may at least in some embodiments renew the reservation to extend its access to the instance. Such instance allocations, in which the client controls how long it accesses a resource instance and when the instance is terminated, may be termed "uninterruptable" instance allocations, and the corresponding instances may be referred to as uninterruptible instances.

In contrast, some pricing modes may be associated with interruptible instance allocations. In the spot-price mode, a client may specify the maximum price per unit time that the client is willing to pay for a particular type of resource. If the client's maximum price exceeds a dynamic spot price determined at least in part by supply and demand, that type of resource may be provided to the client. In this case, the dynamic price spot price may be referred to as a market-based price or price level. In some embodiments, dynamically resizable pools of resource instances may be set aside for the different reservation types or modes—e.g., long-term reserved instances may be allocated from one pool, on-demand instances from another and so on. Such a computing resource may be referred to as an interruptible instance allocation, an interruptible instance, a spot instance or a computing resource with an interruptibility property.

During periods when the supply of the requested resource type exceeds the demand, the spot price may become significantly lower than the price for on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone are insulated from failures in other availability zones. For example, a failure in one availability zone may not be expected to result in a failure in any other availability zone. Thus in some embodiments, the availability profile of a resource instance may be independent of the availability profile of a resource instance in a different availability zone. Clients may thus be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

Figure 3:
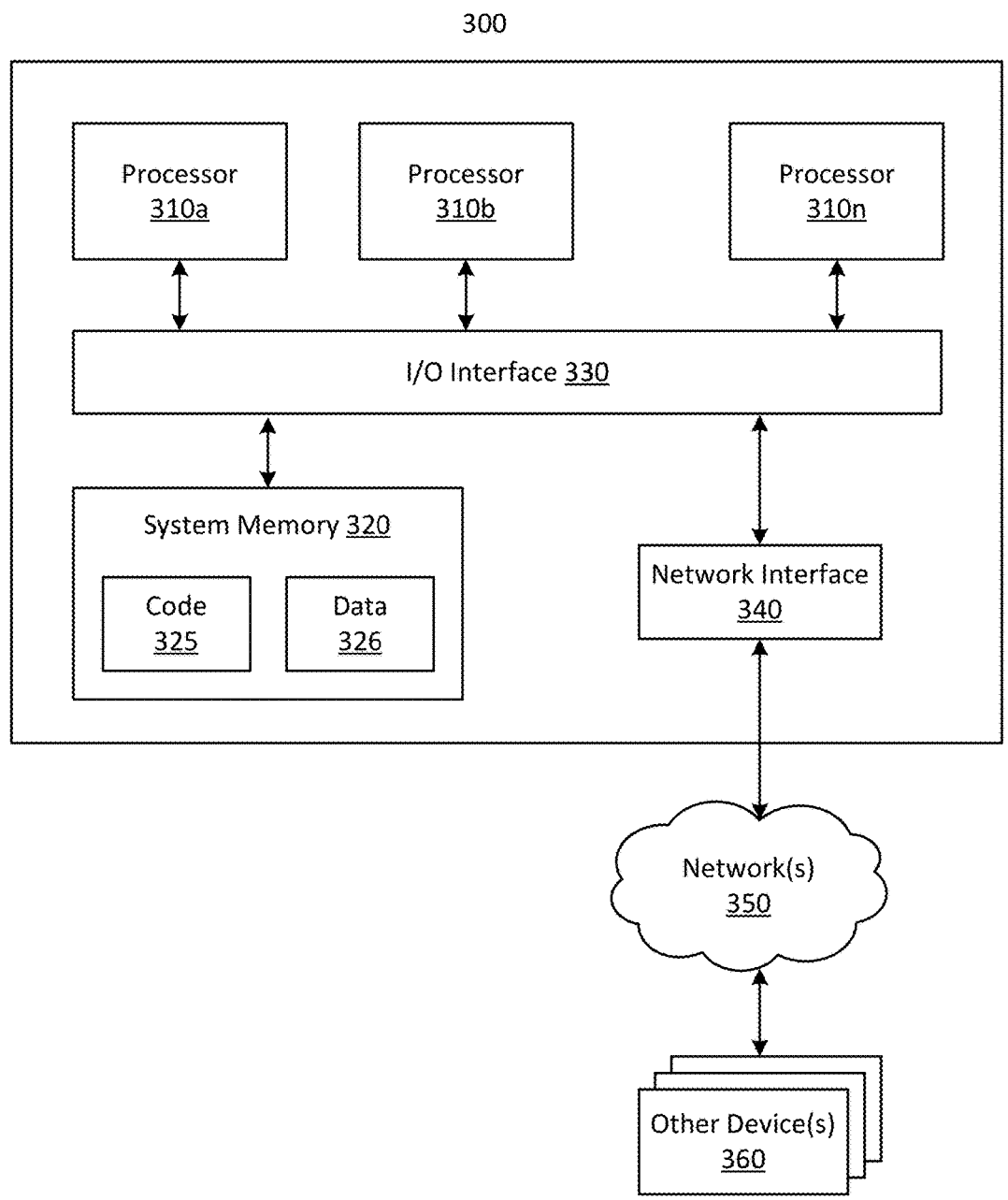
FIG. 3 is a diagram illustrating an example computing system that may be used in some embodiments.

In at least some embodiments, a server that implements a portion or all of one or more of the technologies described herein, including the techniques to implement the functionality of a transfer analysis service 180 may include a general purpose computer system that includes or is configured to access one or more computer-accessible media. FIG. 3 illustrates such a general purpose computing device 300. In the illustrated embodiment, computing device 300 includes one or more processors 310a, 310b, and/or 310n (which may be referred herein singularly as "a processor 310" or in the plural as "the processors 310") coupled to a system memory 320 via an input/output (I/O) interface 330. Computing device 300 further includes a network interface 340 coupled to I/O interface 330.

In various embodiments, computing device 300 may be a uniprocessor system including one processor 310 or a multiprocessor system including several processors 310 (e.g., two, four, eight, or another suitable number). Processors 310 may be any suitable processors capable of executing instructions. For example, in various embodiments, processors 310 may be general purpose or embedded processors implementing any of a variety of instruction set architectures (ISAs), such as the x86, PowerPC, SPARC, or MIPS ISAs, or any other suitable ISA. In multiprocessor systems, each of processors 310 may commonly, but not necessarily, implement the same ISA.

System memory 320 may be configured to store instructions and data accessible by processor(s) 310. In various embodiments, system memory 320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 320 as code 325 and data 326.

In one embodiment, I/O interface 330 may be configured to coordinate I/O traffic between processor 310, system memory 320, and any peripheral devices in the device, including network interface 340 or other peripheral interfaces. In some embodiments, I/O interface 330 may perform any necessary protocol, timing, or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computing device 300 and other device or devices 360 attached to a network or network(s) 350, such as other computer systems or devices as illustrated in FIGS. 1 through 3, for example. In various embodiments, network interface 340 may support communication via any suitable wired or wireless general data networks, such as types of Ethernet networks, for example. Additionally, network interface 340 may support communication via telecommunications/telephony networks, such as analog voice networks or digital fiber communications networks, via storage area networks, such as Fibre Channel SANs or via any other suitable type of network and/or protocol.

In some embodiments, system memory 320 may be one embodiment of a computer-accessible medium configured to store program instructions and data as described above for implementing embodiments of the corresponding methods and systems. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 300 via I/O interface 330. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 300 as system memory 320 or another type of memory. Further, a computer-accessible medium may include transmission media or signals such as electrical, electromagnetic or digital signals, conveyed via a communication medium such as a network and/or a wireless link, such as may be implemented via network interface 340. Portions or all of multiple computing devices, such as those illustrated in FIG. 3, may be used to implement the described functionality in various embodiments; for example, software components running on a variety of different devices and servers may collaborate to provide the functionality. In some embodiments, portions of the described functionality may be implemented using storage devices, network devices, or special purpose computer systems, in addition to or instead of being implemented using general purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g., size, platform, tenancy, availability zone, and the like) and quickly launch the instances for deployment. On-demand instances may further be added or removed as needed, either manually or automatically through auto scaling, as demand for or capacity requirements changes over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages) that allows clients to learn about, select, purchase access to and/or reserve resource instances. In some embodiments discussed below where an entity, such as a resource manager or a pricing optimizer, is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager and the pricing optimizer. Such an interface may include capabilities to allow browsing of a resource catalog and details and specifications of the different types or sizes of resources supported and the different reservation types or modes supported, pricing models, and so on.

The provider network may support several different purchasing modes (which may also be referred to herein as reservation modes) corresponding to some of the instance types described above. For example, the provider network may support long-term reservations, on-demand resource allocations, or spot-price-based resource allocations. Using the long-term reservation mode, a client may make a low, one-time, upfront payment for a resource instance, reserve it for a specified duration, such as a one- or three-year term, and pay a low hourly rate for the instance; the client would be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit of time that it is willing to pay for a particular type of resource, and if the client's maximum price exceeded a dynamic spot price determined at least in part by supply and demand, then that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for the on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

Figure 4:
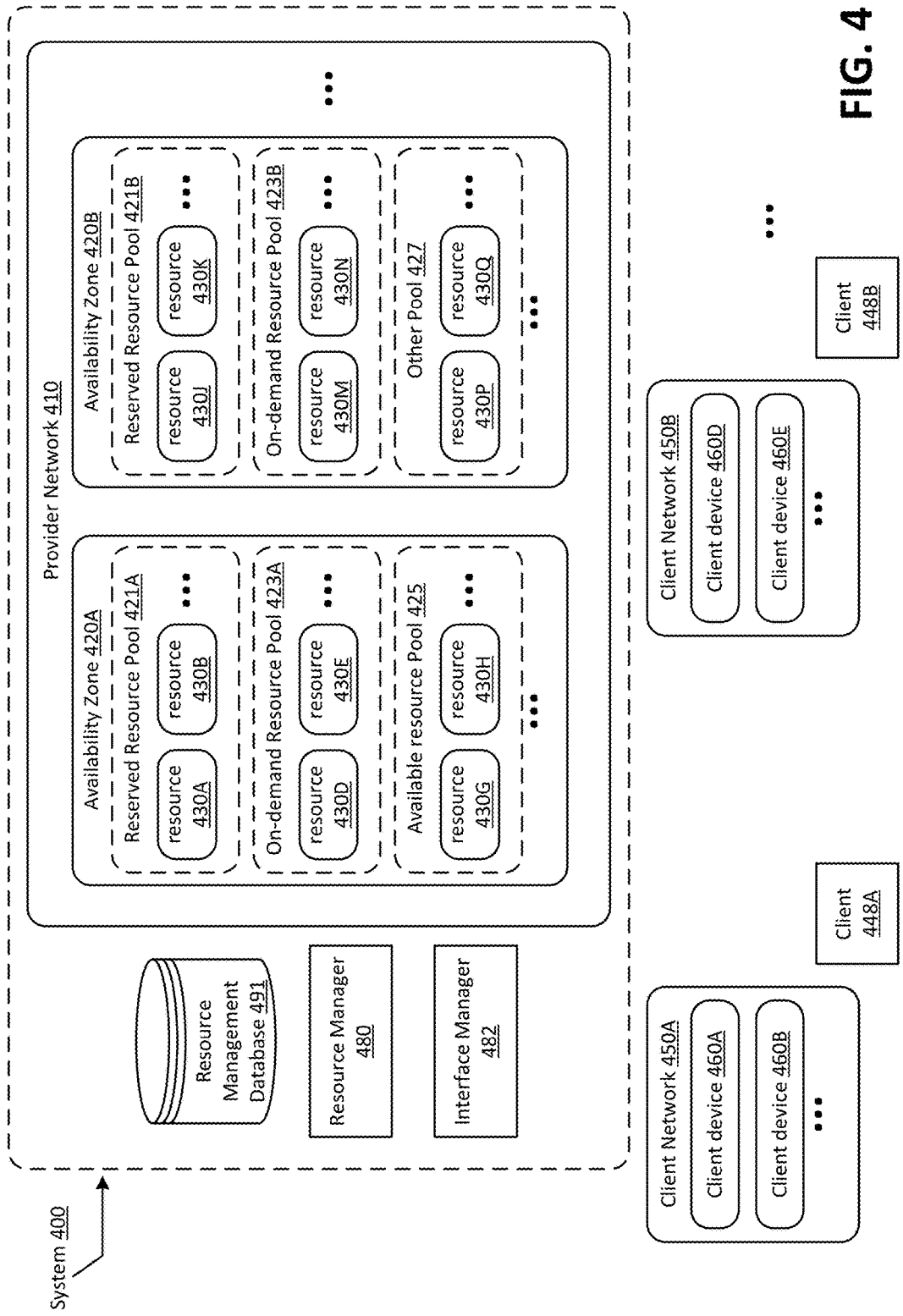
FIG. 4 is a diagram illustrating an example computing system that may be used in some embodiments.

FIG. 4 illustrates an example system environment for providing instances, according to at least some embodiments. The system 400 may include a provider network 410 comprising a plurality of resource instances 430 (which may be referred herein singularly as "a resource instance 430" or in the plural as "the resource instances 430"), such as instances 430A, 430B, 430D, 430E, 430G, and 430H in one availability zone 420A and instances 430J, 430K, 430M, 430N, 430P, and 430Q in a different availability zone 420B. The various resource instances 430 in the availability zones 420A and 420B (which may be referred singularly as "an availability zone 420" or in the plural as "the availability zones 420") may be reserved and/or allocated for use by clients (or potential clients), such as client 448A and 448B (which may be referred herein singularly as "a client 448" or in the plural as "the clients 448"). In the illustrated embodiment, system 400 includes a resource manager 880 and an interface manager 442. As noted earlier, in some embodiments the functionality of the interface manager 482 may be implemented by a subcomponent of the resource manager 480.

The interface manager 442 may in some embodiments implement one or more programmatic interfaces allowing clients 448 to search for, browse, reserve, and acquire instances 430 to obtain various types of services, e.g., to run and/or access various applications. In the illustrated embodiment, at a given point in time, some or all of the instances 430 may be assigned to instance pools, such as reserved instance pools 421A or 421B, on-demand instance pools 423A or 423B, available instance pool 425, or other pools, such as other pool 427.

In some embodiments a given pool, such as available instance pool 425, may itself contain its own sub-pools, e.g., based on the modes of instance reservation and allocation supported. Each pool (or sub-pool) may have an associated pricing policy for its instances, as well as other properties, such as interruptibility settings, for the instances that happen to be assigned to the pool or sub-pool. The pools may represent logical collections or aggregations, so that, for example, the presence of two instances in the same pool or sub-pool may not necessarily imply anything about the physical location of the hardware used for the two instances. Although the instances 430 illustrated in FIG. 4 are shown as belonging to availability zones 420, in other embodiments the provider network 410 may be organized differently, e.g., in some embodiments availability zones 420 may not be implemented. Availability zones 420 may be grouped into geographic regions (not shown in FIG. 4) in some embodiments. Instance pools may be implemented within availability zones in some implementations (e.g., each availability zone may have its own reserved instance pool); while in other implementations an instance pool or sub-pool may span multiple availability zones.

Figure 5:
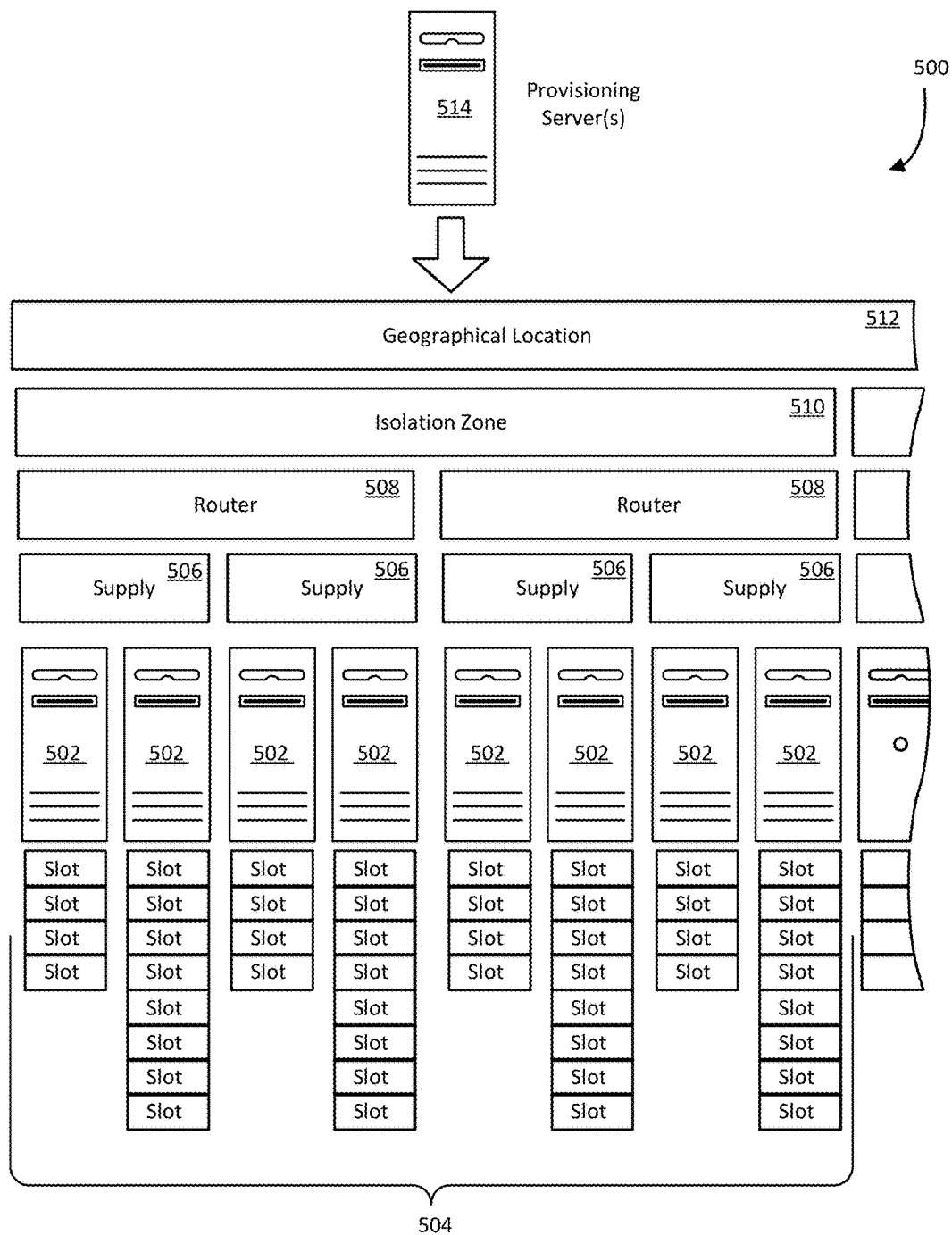
FIG. 5 is a diagram illustrating an example computing system that may be used in some embodiments.

In some embodiments, such as in FIG. 5, a data center 500 may be viewed as a collection of shared computing resources and/or shared infrastructure. For example, as shown in FIG. 5, a data center 500 may include virtual machine slots 504, physical hosts 502, power supplies 506, routers 508, isolation zone 510, and geographical location 512. A virtual machine slot 504 may be referred to as a slot or as a resource slot. A physical host 502 may be shared by multiple virtual machine slots 504, each slot 504 being capable of hosting a virtual machine, such as a guest domain. Multiple physical hosts 502 may share a power supply 506, such as a power supply 506 provided on a server rack. A router 508 may service multiple physical hosts 502 across several power supplies 506 to route network traffic. An isolation zone 510 may service many routers 508, the isolation zone 510 being a group of computing resources that may be serviced by redundant resources, such as a backup generator. Isolation zone 510 may reside at a geographical location 512, such as a data center 500. A provisioning server 514 may include a memory and processor configured with instructions to analyze user data and rank available implementation resources using determined roles and shared resources/infrastructure in the calculation. The provisioning server 514 may also manage workflows for provisioning and deprovisioning computing resources as well as detecting health and/or failure of computing resources.

A provisioning server 514 may determine a placement of the resource within the data center. In some embodiments, this placement may be based at least in part on available computing resources and/or relationships between computing resources. In one embodiment, the distance between resources may be measured by the degree of shared resources. This distance may be used in the ranking of resources according to role. For example, a first system on a host 502 that shares a router 508 with a second system may be more proximate to the second system than to a third system only sharing an isolation zone 510. Depending on an application, it may be desirable to keep the distance low to increase throughput or high to increase durability. In another embodiment, the distance may be defined in terms of unshared resources. For example, two slots 504 sharing a router 508 may have a distance of a physical host 502 and a power supply 506. Each difference in resources may be weighted differently in a distance calculation.

A placement calculation may also be used when selecting a prepared resource to transfer to a client account. In one embodiment, a client requests a virtual machine having an operating system. The provisioning server 514 may determine that the request may be satisfied with a staged volume in a slot 504. A placement decision may be made that determines which infrastructure may be desirable to share and which infrastructure is undesirable to share. Using the placement decision, a staged volume that satisfies at least some of the placement decision characteristics may be selected from a pool of available resources. For example, a pool of staged volumes may be used in a cluster computing setup. When a new volume is requested, a provisioning server 514 may determine that a placement near other existing volumes is desirable for latency concerns. Therefore, the decision may find that sharing a router 508 is desirable but sharing a supply 506 and physical host 502 is undesirable. A volume in the pool may then be selected that matches these attributes and placed preferably on a same router 508 as the other volumes but not the same physical host 502 or power supply 506. In other examples of placement decisions, such as those relating to a database shard, sharing of infrastructure may be less desirable and a volume may be selected that has less infrastructure in common with other related volumes.

In some cases a customer's resource, such as a computing instance, may be scheduled for launch after the instance has been allocated, but the customer may not have been notified of the specific launch date/time. Likewise, a running instance may be scheduled for termination, but the customer may not have been notified of the specific date/time for the termination. As an example, when a customer has signed up for autoscaling, instances for a customer may be launched or terminated in a dynamic manner. However, in many cases customers may need or wish to load software, save usage logs, and take other actions prior to the launch or termination.

A provider network may provide a service for notifying customers that an instance is scheduled to launch, terminate, or undergo some other change of operational status. The notification may be used using a messaging service, for example. The instance may be kept in a wait or pending state while the customer has a chance to interact with the instance (e.g., download logs, install or modify software). Once the customer is completed with the customer's interactions, the customer may provide a notification to the provider network to proceed with the launch or termination. For example, an autoscaling function may take the action of adding capacity by launching a computing resource for a customer, or reducing capacity by terminating a computing resource for a customer. In one embodiment, the computing resource is placed in a pending state during the act of provisioning or deprovisioning the capacity. In some embodiments, the capacity can be placed in the pending state at different points in the provisioning or deprovisioning process. For example, an instance can be placed in the pending state after the instance is running but before the instance is added to the load balancer. The instance can also be placed in the pending state immediately after being added to the load balancer but before the instance is considered to be fully provisioned by the autoscaling function. The customer may use the pause or pending state to interact with the provisioning/deprovisioning capacity (instance), and not just influence the behavior of the autoscaling function.

The disclosed embodiments may be implemented for transitions other than launches and terminations. For example, the customer may be notified prior to placing the customer's instances behind the load balancer. In general, a customer may be provided notifications whenever a significant action in the life cycle of a computing resource is scheduled to occur, in particular those that the service provider typically schedules and for which the customer may want the opportunity to review or take action and approve or cancel before proceeding with the transition.

The customer may also be provided the ability to provide a notification to the provider network if, for example, the customer wishes to keep the instance in the pending or wait state for a longer time period. For example, a software installation may be taking longer than usual and the customer may wish to delay the transition action for an additional period of time. In some embodiments the provider network may implement a timeout period that may indicate a maximum amount of time that the provider network will wait for the customer to take action during a pending or waiting state.

By providing notifications to customers in this way, customers may be able to more effectively and advantageously manage their computing resources. In one embodiment, notifications and/or status information may be provided to clients using an interface. In some embodiments, the notifications and/or status information may be provided via a programming interface. For example, the notifications may be reported to customers via application programming interfaces (APIs) in a status field. At least one of the APIs may be configured to receive electronic messages that encode identifiers indicative of requests for information pertaining to transitions. In response to receiving one of the electronic messages, an API may send electronic messages indicative of information pertaining to a current status of the transition. In one embodiment, a detailed status field may also be provided. This transition instance status information may be updated at various intervals.

The transition status information may be machine-readable, human-readable or both. Some examples of possible transition information may include:

pending evaluation—a customer request has been submitted for review and is pending evaluation;
    proceed with launch—the customer request is completed and the requested resource will be launched as scheduled;
    proceed with termination—the customer request is completed and the requested resource will be terminated as scheduled; and
    pending—the transition will continue to wait in the pending state.

By providing the transition status information, a customer may respond with appropriate actions to ensure that the customer's resources will be prepared for the pending transition. The client may also respond with actions to more efficiently manage workflows that are being executed on the customer's resources and are scheduled to be terminated. In one embodiment, a customer may request that checkpointing (i.e., generating and storing a snapshot of an application state for later use when the application is restarted) be performed for applications running on a resource that will be terminated. Furthermore, by monitoring the transition status information, subscriptions to services provided by the provider network can be activated or de-activated as appropriate. Finally, by integrating the resource status information with the resource instance life cycle, clients can more effectively manage applications running on the customer's resources.

The transition status information can be provided using a number of notification methods. For example, notifications can be pushed to a client by using messaging mechanisms such as e-mail messaging. Notifications can also be provided using programmatic methods such as providing data via a programming interface.

In some embodiments, the resource status information can be used to more efficiently start up services when launching a resource or disconnect/terminate services when a resource is terminated. For example, a customer may be subscribed to a load balancing service that automatically distributes incoming application traffic across multiple instances. When a resource is to be terminated, this transition information can be provided to the client and the client can be proactively unsubscribed from the load balancing service, thereby not taking up any unnecessary data traffic and allowing the service be terminated gracefully.

Additionally, in many cases customers may provide applications on their resources that are used by third-party users of the applications. If a resource is unexpectedly terminated, the third-party user may have a bad experience through data loss or due to an interruption of service when the applications running on the resource are terminated and transferred to another resource. Although a client may continually poll status information to better anticipate loss of a resource, such polling can be time consuming and may not provide timely information.

Figure 6:
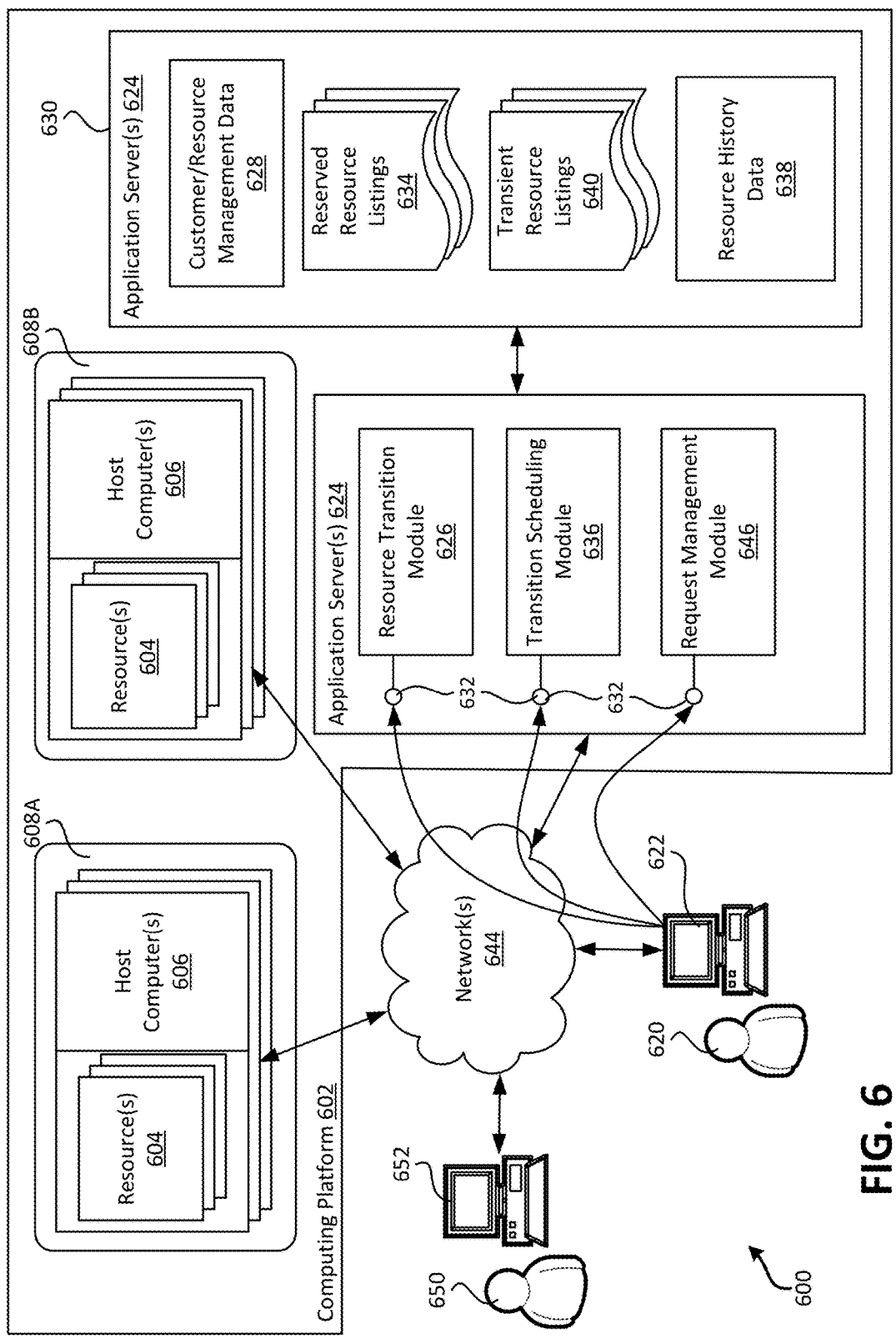
FIG. 6 is a diagram illustrating systems for providing transition notifications in accordance with the present disclosure.

FIG. 6 is a system diagram that shows an illustrative operating environment 600 including several components for implementing a resource transition manager. The environment 600 may include a computing platform 602. The computing platform 602 may be implemented by a computing resource provider to make computing resources available to customers 620 for the deployment and execution of distributed applications.

The computing resources provided by the computing platform 602 may include various classes of resources, such as data processing resources, data storage resources, data communication resources, and the like. Each class of computing resource may be general-purpose or may be available in a number of specific configurations. For example, data processing resources provided by the computing resource provider may be made available in discrete units or resources 604. Each resource 604 may represent, for example, the data processing resources of a dedicated host computer 606, referred to as a dedicated tenancy instance, or each resource 604 may represent a virtual machine instance executing on a host computer 606, which may also be referred to as a shared tenancy instance.

The host computers 606 may represent generic multi-processor server devices, special purpose hardware devices, and the like. As discussed above, various types and configurations of resources 604 may be made available. For example, each available resource 604 of data processing resources may be of a particular size—such as small, medium, and large—representing different combinations of physical and/or virtual resources comprising or allocated to the resources, such as number and types of processors, amounts of memory, size and speed of local storage, number of networking addresses or communication channels, and/or the like. A resource 604 may further be configured with a particular platform, such as a specific OS and/or hypervisor installed on the instance. Resources 604 may also be made available with specific application software components installed, such as Web server software, database management software, portal software, a specific runtime environment or platform, and the like.

Resources may further be available in specific availability zones 608A and 608B, as described above. As discussed above, an availability zone 608 may represent a particular physical location, such as a data center or other physical and/or logical grouping of underlying host computers 606 and computing devices supporting the instances 604 provided by the computing platform 602. Providing resources 604 in different sizes and in different availability zones 608 may allow a deployed application to be geographically dispersed, improving end-user performance and insulating the overall application from failures in one particular location or zone. For example, a customer 620 may choose to deploy a number of small resources 604 across multiple availability zones 608 for some functions of the application, such as Web servers, while deploying a single, large resource 604 for other functions, such as a database server, for example. The customer 620 may also require that resources 604 be hosted by host computers 606 in particular geographical locations for geopolitical reasons.

End-users 650 may utilize end-user computer systems 652 to access the functionality of the application executing on the allocated instances 604 through one or more networks 644. The network(s) 644 may represent a combination of local-area networks (LANs), wide-area networks (WANs), the Internet, and/or any other networking infrastructure known in the art that connects the host computers 606 in the computing platform 602 to the end-user computer systems 652, to each other and to other computing resources. The end-user computer systems 652 may represent personal computers (PCs), desktop workstations, laptops, notebooks, personal digital assistants (PDAs), electronic-book readers, game consoles, set-top boxes, consumer electronics devices, server computers, or any other computing device capable of connecting to the network(s) 644 and communicating with the host computers 606 in the computing platform 602.

A customer 620 wishing to access resources on the computing platform 602 may similarly utilize a customer computer system 622 to connect the computing platform over the network(s) 644 and to configure and manage the computing resources provided by the computing platform. In this regard, the computing platform 602 may include a number of application servers 624 that provide various management services to the customer 620 for purchasing and maintaining resources 604 of data processing and/or other computing resources, deploying components of the application across the purchased resources 604, monitoring and administering execution of the application and the like. As in the case of the end-user computer systems 652, the customer computer systems 622 may represent PCs, desktop workstations, laptops, notebooks, PDAs, electronic-book readers, game consoles, set-top boxes, consumer electronics devices, server computers, or any other computing device capable of connecting to the network(s) 644 and communicating with the application servers 624 in the computing platform 602.

The application servers 624 may represent standard server computers, database servers, Web servers, network appliances, desktop computers, other computing devices, and any combination thereof. The application servers 624 may execute a number of modules in order to provide the management services. The modules may execute on a single application server 624 or in parallel across multiple application servers in the computing platform 602. In addition, each module may consist of a number of subcomponents executing on different application servers 624 or other computing devices in the computing platform 602. The modules may be implemented as software, hardware, or any combination of the two.

The application servers 624 may execute an resource transition module 626. The resource transition module 626 may be configured to provide notifications to customers 620 regarding resources 604 or other computing resources. Resources 604 may include resources that may be obtained through various modes, such as reserved resources, transient resources, and on-demand resources as described above. Purchased resources 604 for each customer 620 and corresponding configuration and status information may be stored in customer/resource management data 628. The customer/resource management data 628 may be stored in a database 630 or other data storage system available to the application server(s) 624 in the computing platform 602.

Reserved resources provide the customer with the ability to reserve a number of a specific type and configuration of resources for a term, such as one year or three years. The reserved resources may represent actual instances of data processing resources configured as specified and placed in stand-by for launch and deployment by the customer 620 at a future time, or the reserved resources 604 may represent overall capacity reserved by the computing resource provider for quick configuration and launch when required. When deploying an application, a customer 620 may purchase and launch a number of on-demand resources 604 of a specific type and configuration (e.g., size, platform, tenancy, availability zone, and the like) to support immediate availability of the application, as well as a number of reserved resources of the same or similar type and configuration for scaling up the application in the future in response to increased demand or capacity requirements of the application, for example.

A customer 620 may utilize a Web browser application executing on the customer computer system 622 to access a user interface presented by the resource transition module 626 through a Web service to view notifications regarding the customer's purchased resources 604. The customer 620 may also utilize a Web browser application executing on the customer computer system 622 to access a user interface presented by the request management module 646 through a Web service to request actions regarding the customer's resources as discussed above. Additionally or alternatively, the resource transition module 626 or request management module 646 may expose an application programming interface (API) 632, which may be accessed over the network(s)

644 by stand-alone application programs executing on the customer computer system 622. Other mechanisms for accessing the configuration and maintenance services of the resource transition module 626 or request management module 646 may also be imagined, including remote procedure calls, SOAP-based Web services, remote file access, proprietary client-server architectures, and the like.

The transition scheduling analyzer 636 may access data and interact with services to determine when transitions for the customer's resources are to be scheduled. The application servers 624 may execute a request management module 646. The request management module 646 may facilitate the fulfillment of the customer's requests based on notifications of scheduled transitions. The request management module 646 may also allow customer 620 to view the status of the customer's resources and requests. The customer 620 may utilize a Web browser application executing on the customer computer system 622 to access a user interfaces (UI) presented by the request management module 646 through a Web service to browse for pending requests and make changes. Additionally or alternatively, the request management module 646 may expose an API 632, which may be accessed over the network(s) 644 by stand-alone application programs executing on the customer computer system 622.

The request management module and security 646 may further store data records regarding submitted and fulfilled requests in the resource history data 638 in the database 630 or other data storage system. The resource history data 638 may be utilized by customer 620 or the computing resource provider to record billing data regarding fulfilled requests.

As discussed, the user can be provided a user interface for submitting a variable capacity request. In one embodiment, a customer may utilize a user interface presented by the request management module 646 of FIG. 6 to view notifications regarding scheduled transitions and provide requests for actions and permissions to proceed with the transitions.

Figure 7:
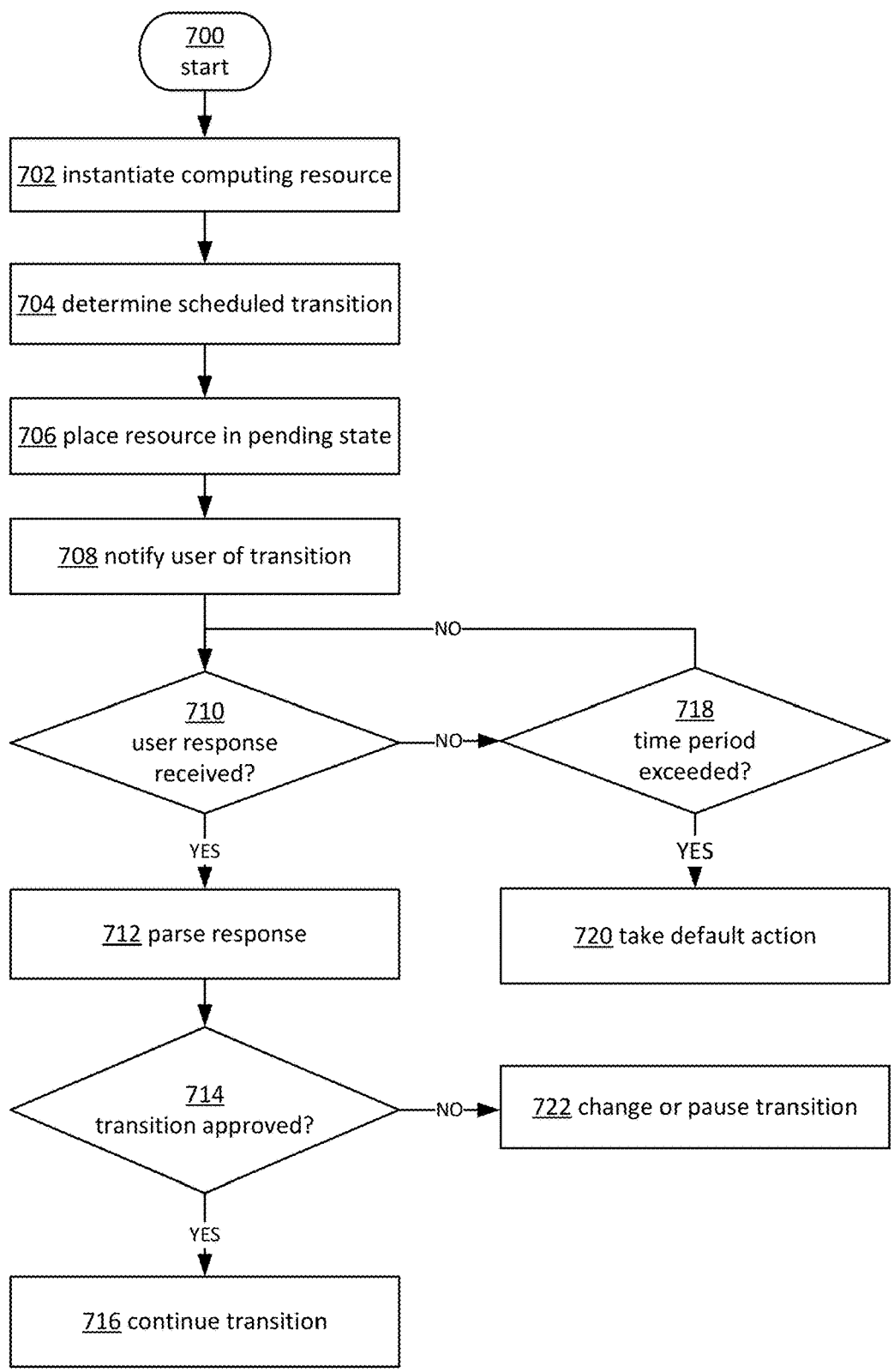
FIG. 7 is a flowchart depicting an example procedure for providing notifications in accordance with the present disclosure.

FIG. 7 illustrates an example operational procedure for managing computing resources as described in this disclosure. In an embodiment, notifications can be provided by services such as a resource transition manager 180 in FIG. 1. The operational procedure may be implemented in a system including one or more computing devices. The system may also include a memory having stored therein computer instructions that, upon execution by the system, perform one or more steps of the operational procedure. Referring to FIG. 7, operation 700 begins the operational procedure. Operation 700 may be followed by operation 702. Operation 702 illustrates instantiating a computing resource on one of the one or more computing devices. The computing resource may be associated with a user. Operation 702 may be followed by operation 704. Operation 704 illustrates determining that the computing resource is scheduled to undergo a transition in the computing resource's operational state. In many cases, the scheduling of the transition has not previously been communicated to the user.

Operation 704 may be followed by operation 706. Operation 706 illustrates placing the computing resource in a pending state.

Operation 706 may be followed by operation 708. Operation 708 illustrates notifying the user that the transition is in progress. Operation 708 may be followed by operation 710. Operation 710 illustrates determining if a response has been received from the user. If a response has been received from the user, then operation 710 can be followed by operation 712. Operation 712 illustrates parsing the response. Operation 712 may be followed by operation 714. Operation 714 illustrates determining if the transition is approved to proceed. The computing resource may be maintained in the pending state until the response is received from the user and the response indicates that the transition is approved to proceed. If the response indicates that the transition is approved to proceed, then operation 714 can be followed by operation 716. Operation 716 illustrates allowing the computing resource to continue with the transition. If the response indicates that the transition is not approved to proceed, then operation 714 can be followed by operation 722. Operation 722 illustrates performing a default action or transition to a different state.

If a response has not been received from the user, then operation 710 can be followed by operation 718. Operation 718 illustrates determining if a predetermined time period has expired. If the predetermined time period has expired, then operation 718 can be followed by operation 720. Operation 720 illustrates that a default action may be taken. The default action may include cancellation of the transition, or any other action as determined by the provider network. If the predetermined time period has not expired, then operation 718 can be followed by operation 710. The predetermined time period may indicate a maximum time period that the provider network will allow for a user to respond to a notification, during which the user may request extensions of time to respond to the notification.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for managing a virtual machine comprising:
    at least one processor;
    at least one memory having stored therein computer instructions that, upon execution by the at least one processor, at least cause the computing system to perform operations comprising:
        determining that the virtual machine is scheduled to undergo a transition, wherein the transition comprises launching of the virtual machine;
        placing the virtual machine in a pending state, wherein the transition does not continue until the virtual machine is removed from the pending state, wherein the virtual machine is kept in the pending state while an installation of software is performed on the virtual machine;
        notifying a user that the transition is scheduled;
        receiving, after completion of the installation of the software, one or more inputs from the user to continue with the transition; and
        in response to the one or more inputs received from the user, allowing the virtual machine to continue with the transition, wherein the one or more inputs are received prior to expiration of a time period that, when exceeded, results in performance of a default action.

2. The computing system of claim 1, wherein information pertaining to the transition is provided via an application programming interface (API) configured to receive data indicative of an identifier for the virtual machine and send data indicative of the transition.

3. The computing system of claim 1, wherein the default action comprises cancellation of the transition.

4. The computing system of claim 1, wherein the time period is extendible based on a request from the user.

5. A computer-implemented method for managing a virtual machine comprising:
    determining that the virtual machine is scheduled to undergo a transition, wherein the transition comprises launching of the virtual machine;
    placing the virtual machine in a pending state, wherein the transition does not continue until the virtual machine is removed from the pending state, wherein the virtual machine is kept in the pending state while an installation of software is performed on the virtual machine;
    notifying a user that the transition is scheduled;
    receiving, after completion of the installation of the software, one or more inputs from the user to continue with the transition; and
    in response to the one or more inputs received from the user, allowing the virtual machine to continue with the transition, wherein the one or more inputs are received prior to expiration of a time period that, when exceeded, results in performance of a default action.

6. The computer-implemented method of claim 5, wherein information pertaining to the transition is provided via an application programming interface (API) configured to receive data indicative of an identifier for the virtual machine and send data indicative of the transition.

7. The computer-implemented method of claim 5, wherein the default action comprises cancellation of the transition.

8. The computer-implemented method of claim 5, wherein the time period is extendible based on a request from the user.

9. One or more non-transitory computer-readable storage media having stored thereon computer-readable instructions that, upon execution on one or more computing devices, at least at least cause the one or more computing devices to perform operations comprising:
    determining that a virtual machine is scheduled to undergo a transition, wherein the transition comprises launching of the virtual machine;

placing the virtual machine in a pending state, wherein the transition does not continue until the virtual machine is removed from the pending state, wherein the virtual machine is kept in the pending state while an installation of software is performed on the virtual machine;

notifying a user that the transition is scheduled;

receiving, after completion of the installation of the software, one or more inputs from the user to continue with the transition; and in response to the one or more inputs received from the user, allowing the virtual machine to continue with the transition, wherein the one or more inputs are received prior to expiration of a time period that, when exceeded, results in performance of a default action.

10. The one or more non-transitory computer-readable storage media of claim 9, wherein information pertaining to the transition is provided via an application programming interface (API) configured to receive data indicative of an identifier for the virtual machine and send data indicative of the transition.

11. The one or more non-transitory computer-readable storage media of claim 9, wherein the default action comprises cancellation of the transition.

12. The one or more non-transitory computer-readable storage media of claim 9, wherein the time period is extendible based on a request from the user.

* * * * *